UNITED STATES PATENT OFFICE.

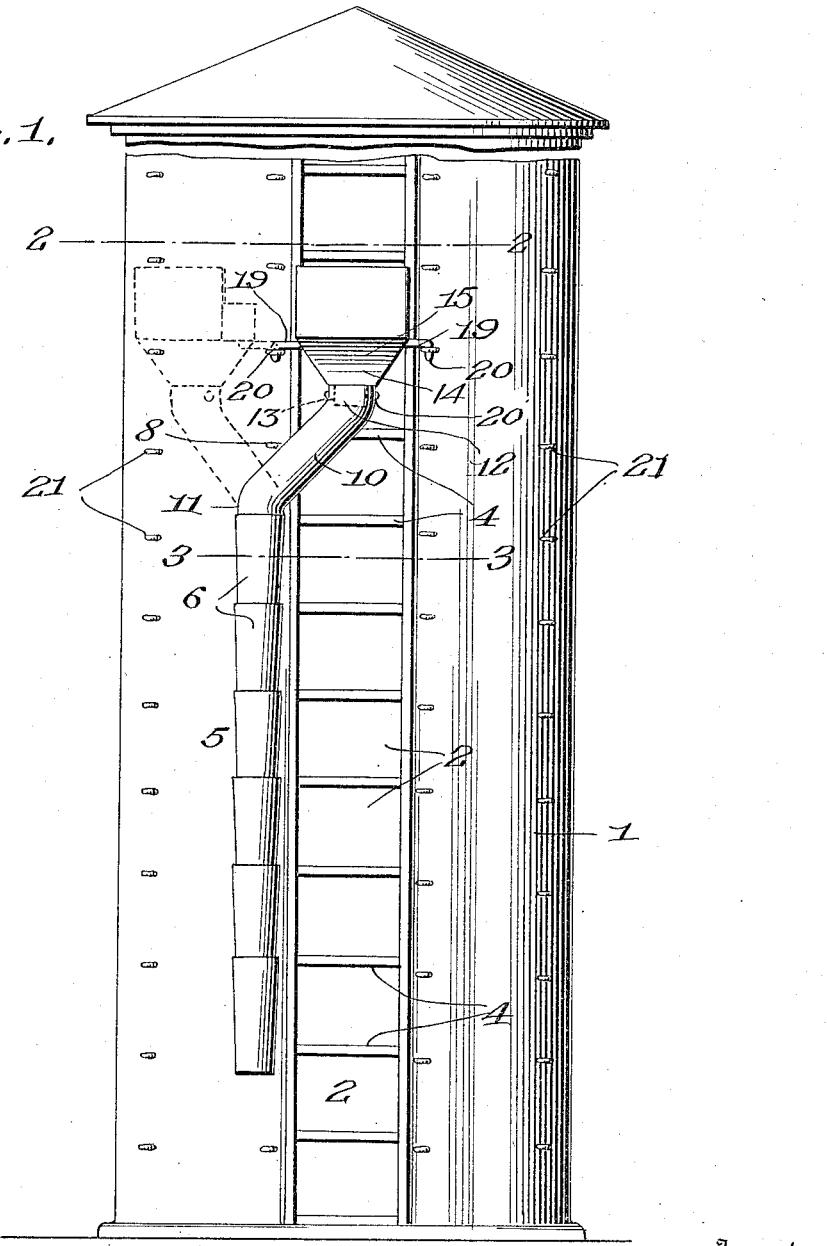

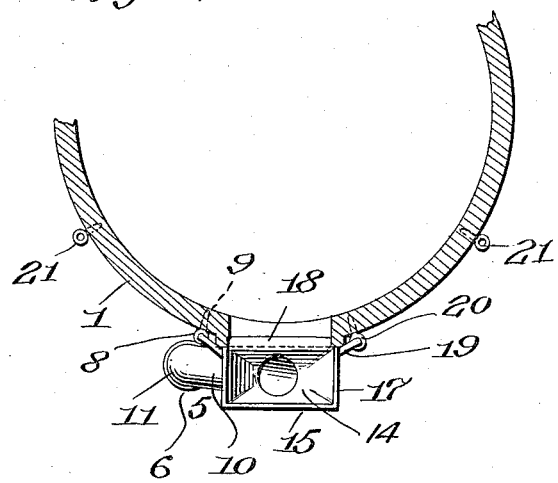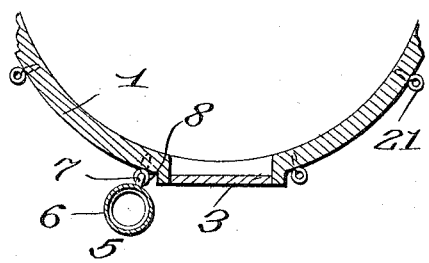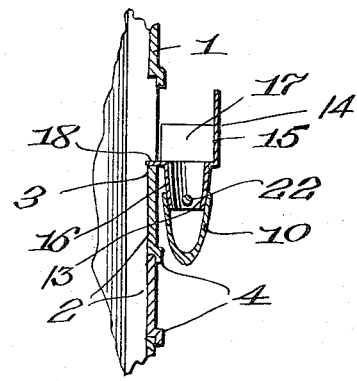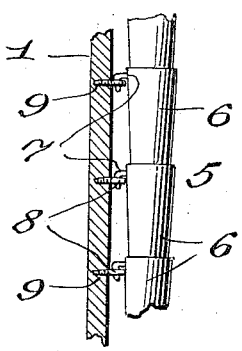

WILLIAM ALFRED COCKRUM, OF KNOXVILLE, TENNESSEE.

SILO-CHUTE.

1,163,508.  Specification of Letters Patent.  Patented Dec. 7, 1915.

Application filed December 22, 1914. Serial No. 878,572.

*To all whom it may concern:*

Be it known that I, WILLIAM ALFRED COCKRUM, a citizen of the United States, residing at Knoxville, in the county of Knox and State of Tennessee, have invented new and useful Improvements in Silo-Chutes, of which the following is a specification.

This invention relates to improvements in silos and especially with reference to improvements in feed chutes for use on silos, the object of the invention being to provide an improved chute of this character which may be readily attached to and removed from a silo; which consists of a series of independently removable sections; and which also embodies a hopper which is pivotally connected to the upper end of the chute and which is adjustable with reference thereto so that the hopper may be arranged over the door or turned to one side thereof, out of the way as desired.

The invention consists in the construction, combination and arrangement of devices hereinafter described and claimed.

In the accompanying drawings:—Figure 1 is an elevation of a chute constructed in accordance with my invention and showing the same arranged for use on a silo and with the hopper arranged at one of the doors, the hopper being shown in dotted lines turned to one side and away from the door. Fig. 2 is a horizontal sectional view on the plane indicated by the line a—a of Fig. 1. Fig. 3 is a similar view on the plane indicated by the line b—b of Fig. 1. Fig. 4 is a detail vertical sectional view through the hopper and at the upper portion of the chute. Fig. 5 is a similar view through the chute.

The silo 1 here shown is of the usual construction provided with a series of removable doors 2 which are arranged in vertical alinement and one above another. The cross bars 3 are shown arranged between the doors and extending across the vertical door opening and each door is shown as provided with a rung 4 so that a ladder is formed to enable a person to climb to any desired height on the silo and to enter the silo through any desired door.

In accordance with my invention I provide a chute 5 to enable feed to be thrown out from the silo at any point, according to the height of the feed in the silo, the chute serving to direct the feed to a restricted area at the base of the silo or to discharge the same into a wagon or the like and to prevent the feed from being scattered when thrown out of the silo. This feed chute comprises a series of tubular sections 6 each of which is slightly tapered downwardly so that the lower end of each section may be loosely fitted in partly overlapped relation in the upper end of the next lower section. Each chute section is provided near its upper end with a hook 7 which is adapted to engage the eye 8 of a screw 9 secured in the wall of the silo, at a point near either side of the door. Any suitable number of the chute sections may be used according to the height of the silo and the extent to which it is filled with ensilage and the chute may be readily taken down from one silo and arranged for use on another, the several sections of the chute being readily detachable and being easily portable.

The upper chute section 10 is inclined and has an elbow 11 at its lower end adapted to be loosely and pivotally telescopically fitted in the uppermost section 6 and at its upper end is also provided with an elbow 12 which is fitted in the discharge neck 13 at the lower end of the hopper 14. The hopper comprises vertical front and rear walls 15—16, the former much higher than the latter, and also comprises end walls 17 which connect said front and rear walls.

At the upper end of the rear wall is a horizontally extended transversely arranged flange 18 which is adapted to bear against the lower side of the door opening opposite which the hopper is placed. Arms 19 extend from opposite sides of the hopper and have downturned hooks 20 which are adapted to be engaged in the eyes of eye bolts 21 with which the silo is provided at points on opposite sides of the door opening. The elbow 12 of the inclined upper chute section 10 may be secured but yet detachably fastened in the neck of the hopper by means of a bolt 22. This bolt may be readily installed or removed. Hence the hopper may be arranged either at the door opening as shown in full lines in Fig. 1 when it is desired to throw feed out of the silo and down through the chute or the hopper may be swung to one side of the doorway as shown in Fig. 1 to enable a person to enter or leave the silo through the door opening. A suitable number of the eye bolts will be provided on the silo to enable the hopper to be adjusted thereto at any desired height.

Having thus described my invention, I claim:—

A silo, a top therefor, a chute having an inclined upper section pivotally connected to the upper end of the chute and a hopper pivotally connected to the upper end of the said inclined section, means to secure the chute to the silo at one side of the door thereof and means to detachably secure the hopper to the silo, the hopper by reason of its pivotal connection with the upper chute member and by reason of the pivotal connection between said member and the chute being adapted to be arranged either in the door or to one side thereof.

In testimony whereof I affix my signature in presence of two witnesses.

WILLIAM ALFRED COCKRUM.

Witnesses:
 EUGENE GARDON,
 F. A. BLACKBURN.